United States Patent
Aszalos et al.

[15] 3,674,867

[45] July 4, 1972

[54] TUMIMYCIN AND PROCESS FOR MAKING SAME

[72] Inventors: Adorjan Aszalos, Princeton; Robert S. Robison, North Brunswick; Nancy Kraemer, Cranford, all of N.J.; Jo Ann Henshaw, Staten Island, N.Y.; Mary Suzanne Giannini, New Brunswick, N.J.

[73] Assignee: E. R. Squibb & Sons, Inc., New York, N.Y.

[22] Filed: Aug. 6, 1970

[21] Appl. No.: 61,564

[52] U.S. Cl..................................424/122, 424/119, 195/80
[51] Int. Cl..........................................................A61k 21/00
[58] Field of Search............................424/122, 119; 195/80

[56] References Cited

OTHER PUBLICATIONS

Miller, The Pfizer Handbook of Microbiaz Metabolites, McGraw–Hill Book Co., Inc., N.Y. 1962, pages 131 and 133

*Primary Examiner*—Jerome D. Goldberg
*Attorney*—Lawrence S. Levinson, Merle J. Smith, Theodore J. Criares, Donald J. Perrella and Burton Rodney

[57] ABSTRACT

Figure 1:
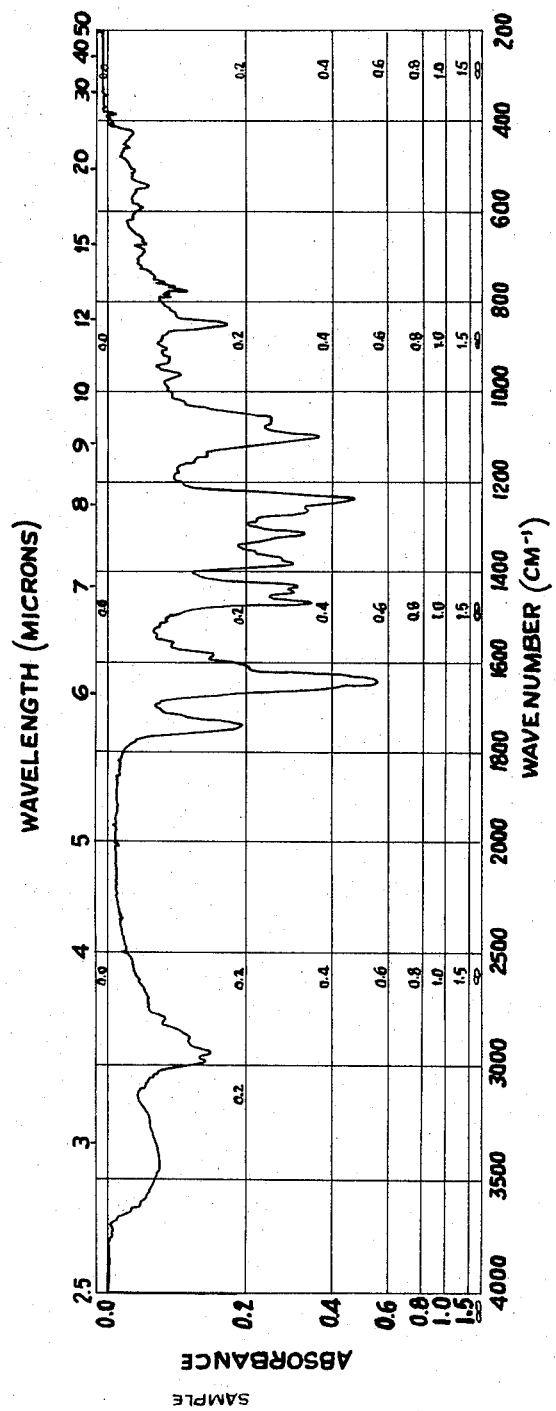
Figure 2:
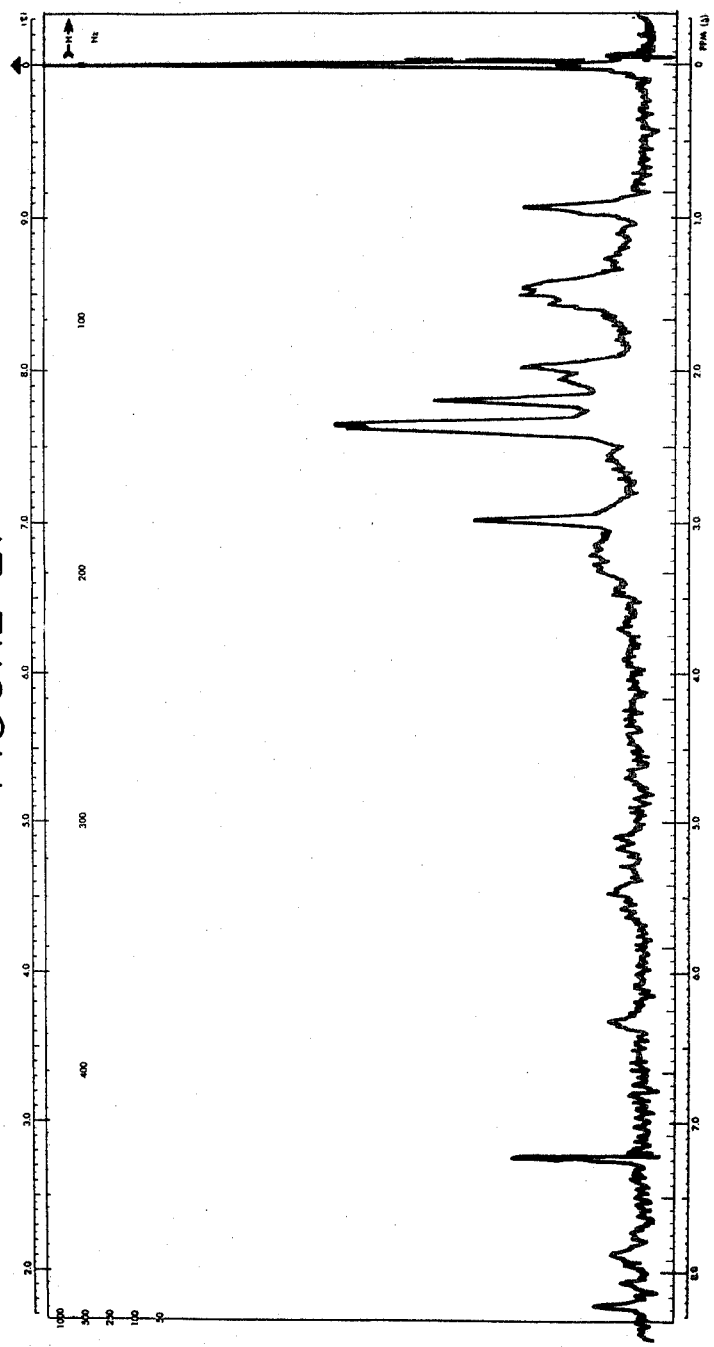

An antibiotic selected from the group consisting of Tumimycin and salts thereof. This antibiotic is an orange-red powder having the following average elemental analysis: carbon, 66.79 percent; hydrogen, 6.85 percent; nitrogen, 3.45 percent; and an infrared absorption spectrum as shown in FIG. 1 and an NMR spectrum as shown in FIG. 2. Tumimycin is useful as an antimicrobial agent.

2 Claims, 3 Drawing Figures

TUMIMYCIN AND PROCESS FOR MAKING SAME

Tumimycin is formed by cultivation, under controlled conditions, of a hitherto undiscovered microorganism which is a species of the genus Streptomyces. This Streptomyces was obtained from coal spoils collected in Pekin, Illinois, U. S. A., and samples of living organism have been deposited without restriction in, and made a part of, the American Type Culture Collection, Rockville, Maryland, from which it is available under accession No. ATCC 21501.

MICROORGANISM

Streptomyces sp ATCC 21501 develops abundantly in culture media usually employed for cultivation of other organisms of the same genus. It is capable of growing at temperatures in the range of from about 20° to 35° C, preferably at a temperature of about 25° C, on an agar slant medium which is prepared by admixing 20 g of tomato paste, 20 g of oatmeal, and 500 ml of boiling water, cooling this mixture to a thin gruel, filtering, adding the filtrate to 15 g of agar in 500 ml of water, and sterilizing the resulting mixture at 121° C and 15 lbs steam pressure for 20 minutes. On this media the aerial mycelium produces conidia which are light brown in color and a light brown soluble pigment is produced.

It is to be understood that the invention is not limited to the use of the particular organism herein described, but includes inter alia variations and mutants obtained by natural selection or by treatment of the microorganism with, for instance, ultraviolet rays, X-rays, manganese chloride, camphor, nitrogen mustards, and the like, as well as polyploids of the various mutants.

The environment and nutritional requirements for the fermentation of Streptomyces sp ATCC 21501 are similar to those necessary for the production of antibiotics by other aerobic microorganisms. Thus, aerobisis can be sustained in a liquid nutrient medium inoculated with a sterile culture incubated in flasks placed on shaking machines. For industrial production, metal tanks with internal aeration and agitation by means of paddles can be substituted. Tumimycin can also be produced by surface cultivation. The microorganism requires as nutrient elements, one or more sources of energy and carbon, organic nitrogenous substances and mineral salts. Cultivation is best effected when the initial pH of the culture medium is between 6.5 and 7.5, the optimum pH being around 7.0.

The utilizable sources of carbon for the production of the antibiotic are very diverse, there being included inter alia sugars (such as glucose, lactose, maltose, sucrose), dextrin, starches of different types of origin, glycerol (and other polyalcohols, inositol and animal and vegetable fats, as well as esters thereof. The sources of organic nitrogen which actively stimulate growth and favor production of Tumimycin are substances such as soybean meal, cotton meal and other vegetable meals (whole or partially or totally defatted), meat flours or animal viscera, various peptones, casein hydrolysates, soybean hydrolysates, yeast hydrolysates, lactalbumin, wheat glutins, distillers solubles, corn steeps, urea and amino acids.

Mineral salts, such as the chlorides, nitrates, sulfates, carbonates and phosphates of sodium, potassium, ammonium and calcium, should be included in appropriate concentrations. The nutritive medium should contain a number of trace elements such as magnesium, iron, copper, manganese, zinc and cobalt.

Under the described conditions and with the temperature of cultivation at about 25° C, maximum production of Tumimycin is obtained in from about 2 to about 5 days in tanks.

The inoculum for the fermentation can be provided from suspensions of spores or of lyophilized mycelium, freeze-dried with an inert substrate. It is usually transferred through one or more passages in liquid media before the final fermentation.

Tumimycin is useful as an antibacterial and antifungal agent against microorganisms as set forth below.

As such, it is of use as a preservative (for example, in leather, paper and paints) and especially in plastics and fabrics to render them proof against mildew or other fungus attack. In the protection of fabrics, for example, the fabric may be impregnated with Tumimycin or a salt thereof as by soaking or spraying. Tumimycin can also be used as a plant protective agent, for which purpose it can be sprayed on the plants to be treated. A suitable spray can be prepared by wet ball-milling Tumimycin or a salt thereof with water and preferably a wetting agent, such as polyoxyalkylene sorbitan higher fatty acid (e.g. Tween 20, a polyoxyethylene sorbitan monolaurate).

Tumimycin may also be employed as a surface disinfectant. For this purpose it is dissolved, preferably also containing a detergent or other cleansing agent, at a concentration of about 0.1 to about 10.0 percent, preferably about 0.5 to about 1.0 percent by weight. Such solutions may then be employed as washes to disinfect floors, walls, tables, and the like, as well as in the cleaning of dairy or food processing equipment.

ISOLATION OF TUMIMYCIN

After fermentation the whole broth is filtered. The filtrate is discarded and the cake is extracted with a non-polar solvent. The antibiotic which is in the non-polar solvent is further purified by precipitation and chromatography. Final purification occurs by successive recrystallization from different solvents.

CHARACTERIZATION

1. When rechromatographed on Eastman Si-gel chromagram, using the solvent system 10 percent methanol-90 percent $CHCL_3$, 90 percent of the material forms a spot at Rf 0.65 and 10 percent of the material forms a spot at Rf 0.55;
2. appearance - orange-red powder;
3. melting point, above 300° C;
4. solubility - soluble in acidic water, methanol, ethyl acetate, chloroform, and ether; insoluble in water and hexene;
5. untraviolet spectrum (in ethanol),

| Abs at mµ | $E_1^1$ |
|---|---|
| 243 | 623 |
| sh 270 | 408 |
| sh 315 | 115 |
| sh 395 | 95 |
| sh 415 | 103 |
| 432 | 107 |
| sh 445 | 89; |

6. elemental analysis:
   C% 66.90, 66.92, 66,67
   H% 7.02, 6.72, 6.80
   N% 3.36, 3.42, 3.48
   No ash, sulfur or halogen;
7. infra-red curve (FIG. 1);
8. nuclear magnetic resonance spectra (FIG. 2);
9. non-aqueous titration for base gives an equivalent weight of 470;
10. N-methyl determination 4.8 percent; no C-methyl;
11. analysis of the HCl salt of the above compound prepared by dissolving in ether, introducing dry HCl gas into this ether solution, centrifugation, washing by ether and drying is:
    melting point above 300° C;
    elemental analysis:
    C% 57.86; H% 6.22;
    N% 3.34; Cl% 7.1;
    chromatography: Eastman Cellulose ITLC solvent 3 percent, MeOH - 97 percent benzene Rf 0.9 HCl,
12. Tumimycin forms salts by reaction with acids in known manner. As examples of such acids, there may be mentioned HCl $H_2SO_4$, $H_3PO_4$, and the like, as well as citric, oxalic and acetic.

Figure 3:
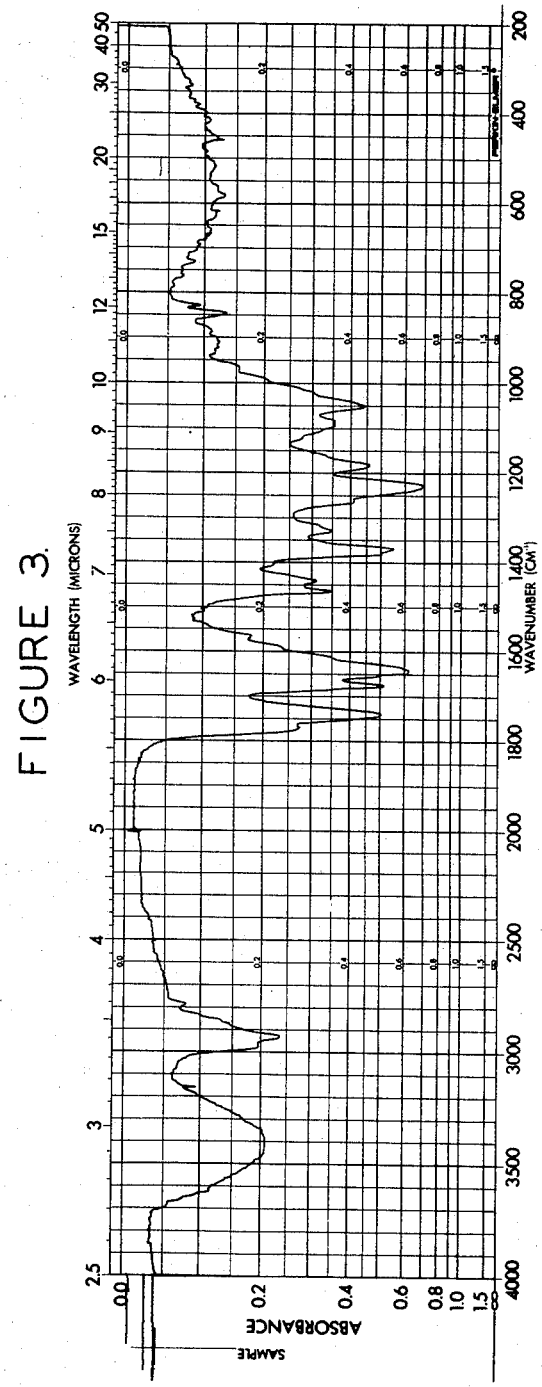

13. analysis of the acetate of the above compound prepared by acetylation in pyridine with acetic anhydride at room temperature for 16 hours; pouring on ice water, extracting with ether, drying the ether solution and recrystallizing from ether-hexene:
melting point 145°–146° C;
elemental analysis: C% 64.85; H% 6.47; N% 2.71;
non-aqueous titration for base = 0;
infra-red curve (FIG. 3)
chromatography:
 Eastman di-gel chromagram ITLC
 10 percent methanol-90 percent $CHCl_3$
 Rf = 0.68

ANTIMICROBIAL PROPERTIES

Tumimycin shows the following in vitro spectrum:

TABLE I

| Microorganism | M.I.C. (mcg/ml) |
|---|---|
| Staph. aureus SC 1276 | 0.6 |
| Escherichia coli SC 2975 | 9.4 |
| Candida albicans SC 5314 | 1.2 |
| Aspergillus niger SC 2828 | 6.3 |
| Salmonella schottmuelleri SC 3850 | 18.7 |
| Pasteurella multocida SC 8739 | 6.3 |
| Pseudomonas aeruginosa SC 3840 | 12.5 |
| Proteus vulgaris SC 8504 | <50.0 |
| Trichophyton mentagrophytes SC 2637 | 25.0 |

Tumimycin differs from other known antibiotics. The only antibiotic that is similar is Iyomycin $B_1$ (Y. Sano, N. Kanda and T. Hata: J. Antibiotics, Tokyo 17, No. 3, p. 117, 1964).

Iyomycin $B_1$ and Tumimycin are similar in elemental analysis, U.V. and I.R. spectra and melting point. The following differences exist however:

a. Tumimycin has a characteristic absorption peak in its I.R. spectrum at 9.10 microns which is not present in the I.R. spectrum of Iyomycin $B_1$. Also Iyomycin $B_1$ has an absorption peak in its I.R. spectrum at 8.95 microns which absorption is lacking in the I.R. spectrum of our antibiotic.

b. The $E_1^1$ values of corresponding absorption places in the U.V. spectra are different:

| Tumimycin | | Iyomycin $B_1$ | |
|---|---|---|---|
| | $E_1^1$ | | $E_1^1$ |
| abs at m$\mu$ 243 | 623 | | 500 |
| 270 | 480 | | 330 |
| 430-2 | 96 | | 107 | c. $Ld_{50}$ for Tumimycin is 40 mg/kg I.V. (mice). For Iyomycin $B_1$ $Ld_{50}$ is 5 mg/kg I.V. (mice).

The following examples illustrate the preparation and isolation of Tumimycin.

EXAMPLE 1

Fermentation

The culture, ATCC 21501, producing this antibiotic is grown for 8 days on an agar medium containing Heinz Baby Oatmeal and Contadina Tomato Paste. The growth is then suspended in 0.01 percent dupanol solution and transferred to 50 ml of a liquid medium contained in a 250 ml Erlenmeyer flask. This medium contains 2.5 percent cornsteep liquor, 3.0 percent solvent extracted soybean meal, 5.5 percent cerelose, 0.7 percent calcium carbonate and the pH is adjusted to 7.0 before sterilization with sodium hydroxide. After 48 hours growth at 25° C on a rotary shaker, the broth is quantitatively transferred to a 4,000 ml Erlenmeyer flask containing the above medium to which has been added 0.025 percent Ucon Lubricant L625 as a defoamer. After 48 hours additional growth at 25° C on a rotary shaker the content of this flask stage is used to inoculate 30 liters of the identical medium in a 38 liter stainless steel germinator tank. The germinator is operated at 25° C with an air rate of 2.0 ft/min. superficial air velocity at 10 PSI and agitation equivalent to 0.2 HP/100 gallons. After 48 hours, 1,500 ml of the resulting broth is transferred to a 38 liter stainless steel fermentor containing 30 liters of medium used in both the germinator and secondary flask stages. For antibiotic production, a temperature of 25° C is used in conjunction with an air rate of 4.0 ft/minute superficial air velocity and agitation equivalent to 0.4 HP/100 gallons. For foam control Ucon Lubricant L625 is added when required. Antibiotic recovery is initiated after 96 or 120 hours of growth.

EXAMPLE 2

Isolation

After 120 hours of fermentation the whole broth is filtered with the addition of 5 percent Hyflo. Since most of the antibiotic is in the cake the filtrate is discarded. The antibiotic-rich cake is extracted eight times with benzene, stirring the cake for at least one hour during each extraction. The extracted cake is discarded after filtration. The antibiotic-rich benzene extracts are combined and taken to dryness. At this point the yield is 6–7 g of a red oily material from 10 liters of whole broth. The red oily residue is triturated with one liter of n-hexene and kept at 5° C for 16 hours. A red precipitate which forms is collected by filtration and is dried. The yield is about 200–300 mg of crude antibiotic with a purity of 10–20 percent, from 10 l of whole broth. The crude product is dissolved in a minimum amount of ethyl acetate and is chromatographed on Eastman Si-gel chromatogram sheets using the 10 percent methanol-90 percent chloroform solvent system. At least six different spots can be detected on the chromatogram after development. The visible yellow, and also red fluorescent spot at Rf 0.65 is scraped off from the chromatogram and is eluted from the Si-gel by ethyl acetate. The crude antibiotic worked up this way yields about 40–50 mg of pure antibiotic. It is recrystallized twice from ethyl acetate-hexene.

What is claimed is:

1. An antibiotic selected from the group consisting of Tumimycin and salts thereof, Tumimycin being an orange-red material having the following average elemental analysis: C, 66.83 percent; H, 6.85 percent; N, 3.42 percent; a melting point above 300° C; an equivalent weight of 470 and which possesses an infra-red absorption spectrum and a nuclear magnetic resonance spectrum as shown in FIGS. 1 and 2, respectively.

2. A process for producing the antibiotic of claim 1 which comprises culturing Streptomyces species ATCC 21501 under aerobic conditions in an aqueous nutrient medium comprising an assimilable, fermentable carbohydrate and assimilable nitrogen source until a substantial amount of antibiotic is accumulated.

* * * * *